Dec. 18, 1928.

L. A. KRUPP 1,696,168

TRACTOR STEERING CONTROL FOR REVOLVING EXCAVATORS OR CRANES

Filed Oct. 22, 1925  6 Sheets-Sheet 5

INVENTOR.
LEO A. KRUPP.

BY

ATTORNEY.

Dec. 18, 1928.  
L. A. KRUPP  
1,696,168  
TRACTOR STEERING CONTROL FOR REVOLVING EXCAVATORS OR CRANES  
Filed Oct. 22, 1925  
6 Sheets-Sheet 6
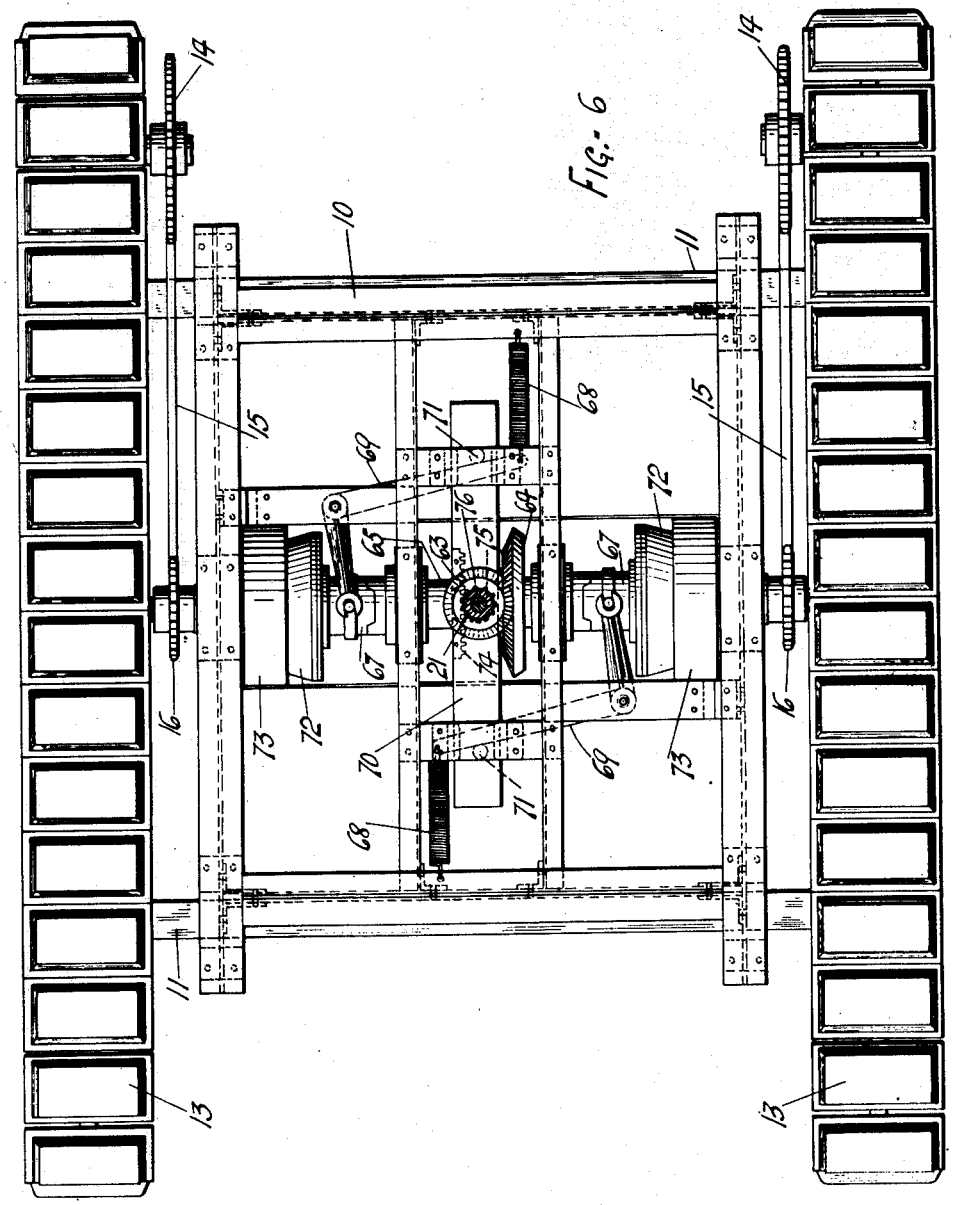
INVENTOR.  
LEO A. KRUPP  
BY  
ATTORNEY Patented Dec. 18, 1928.

1,696,168

UNITED STATES PATENT OFFICE.

LEO A. KRUPP, OF AKRON, OHIO, ASSIGNOR TO THE STAR DRILLING MACHINE COMPANY, OF AKRON, OHIO, A CORPORATION OF OHIO.

TRACTOR STEERING CONTROL FOR REVOLVING EXCAVATORS OR CRANES.

Application filed October 22, 1925. Serial No. 64,075.

This invention relates to power operated, self-propelling shovels, cranes of the revolving type and self-propelled power units in general, and particularly to means for propelling devices of this type carried by apron wheels.

One object of the invention is to provide simple, effective means for driving the apron wheels from the prime mover on the revolving frame of the machine, and to provide means for controlling the operation of said wheels, whereby the machine may be propelled in any desired direction and may be operated to make either wide or sharp turns as circumstances may require.

Other objects of the invention will become apparent as the following detailed description of a power shovel embodying the invention is read in connection with the accompanying drawings.

It is to be understood that the invention is not limited to the specific form thereof as shown and described.

Of the accompanying drawings:

Figure 6 is a plan of the apron wheel carriage on which the shovel is supported.

Figure 1:
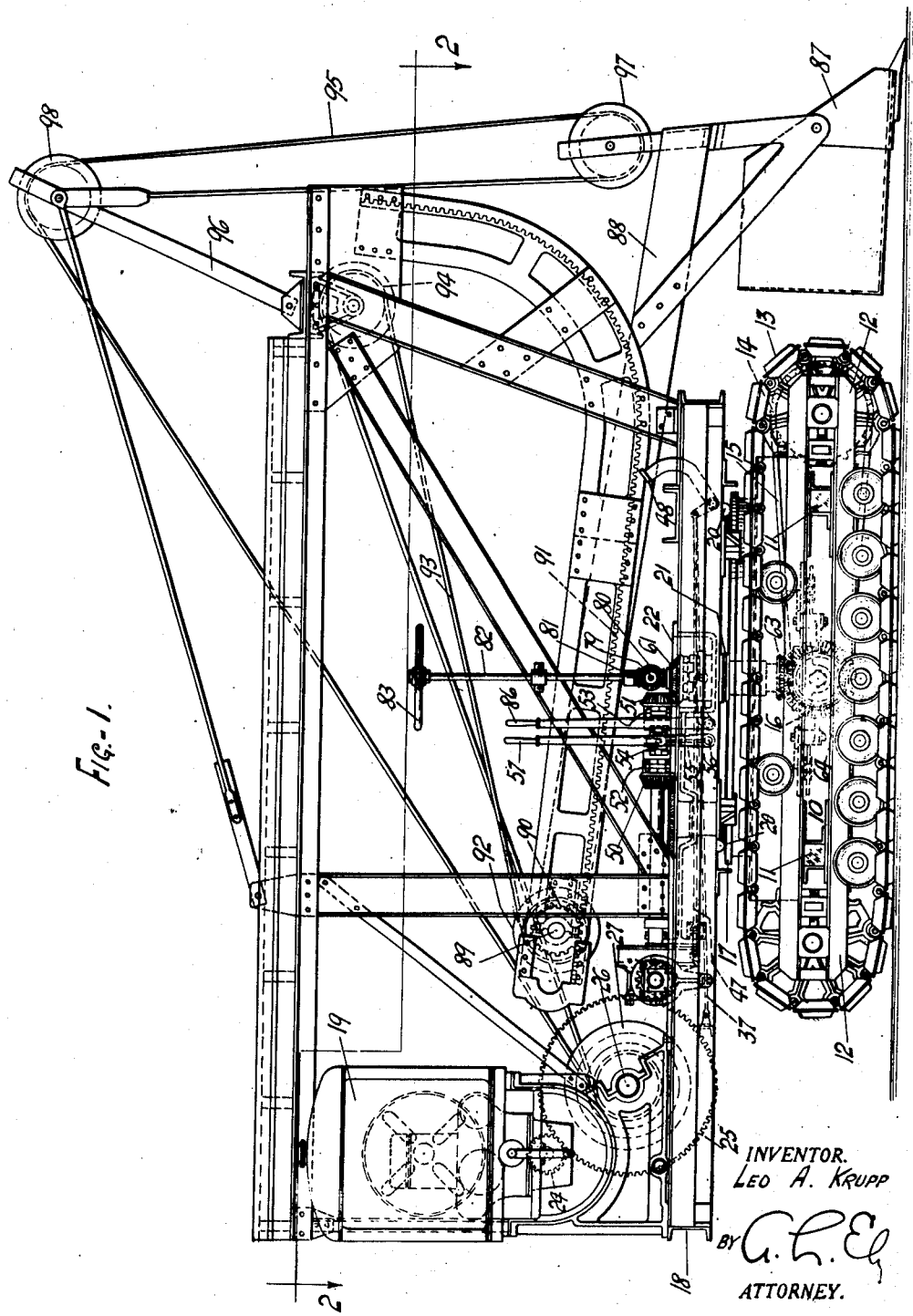
Figure 1 is a side elevation of a power shovel embodying the invention.
Figure 2:
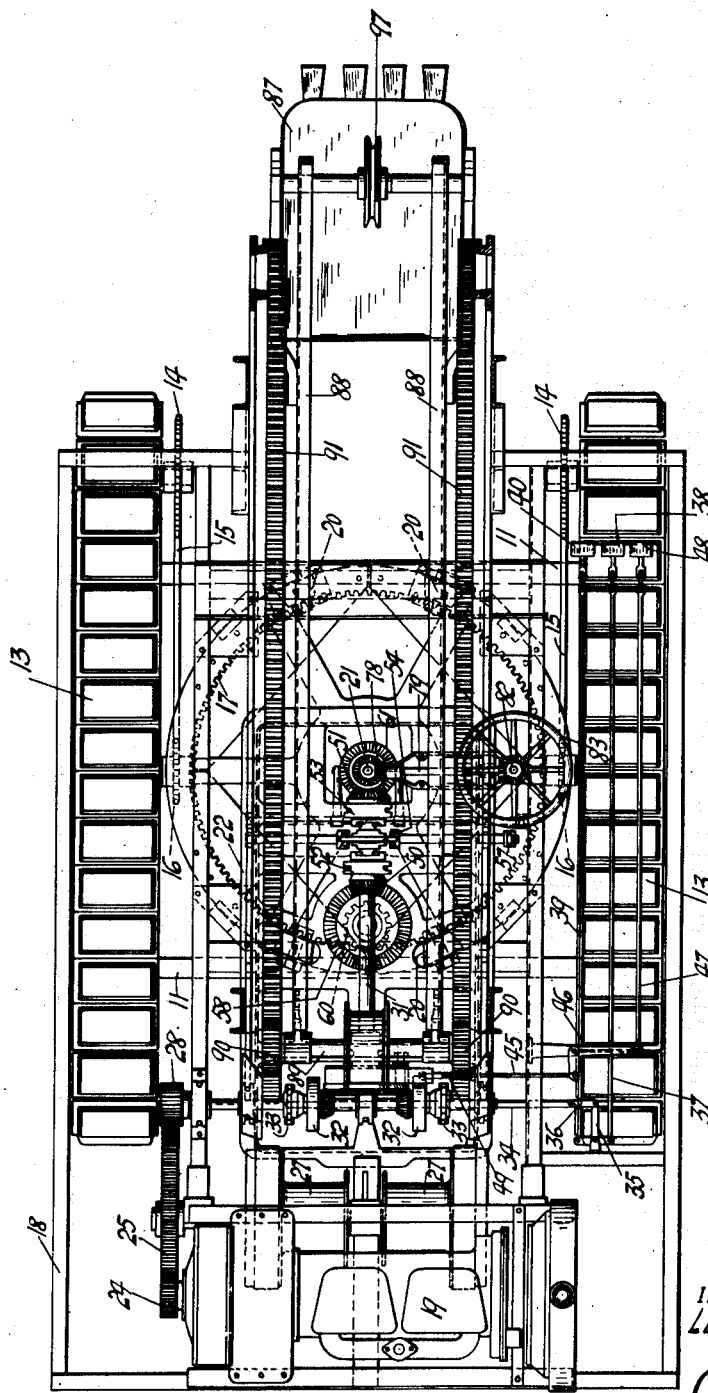
Figure 2 is a sectional plan thereof on line 2—2 of Figure 1.
Figure 3:
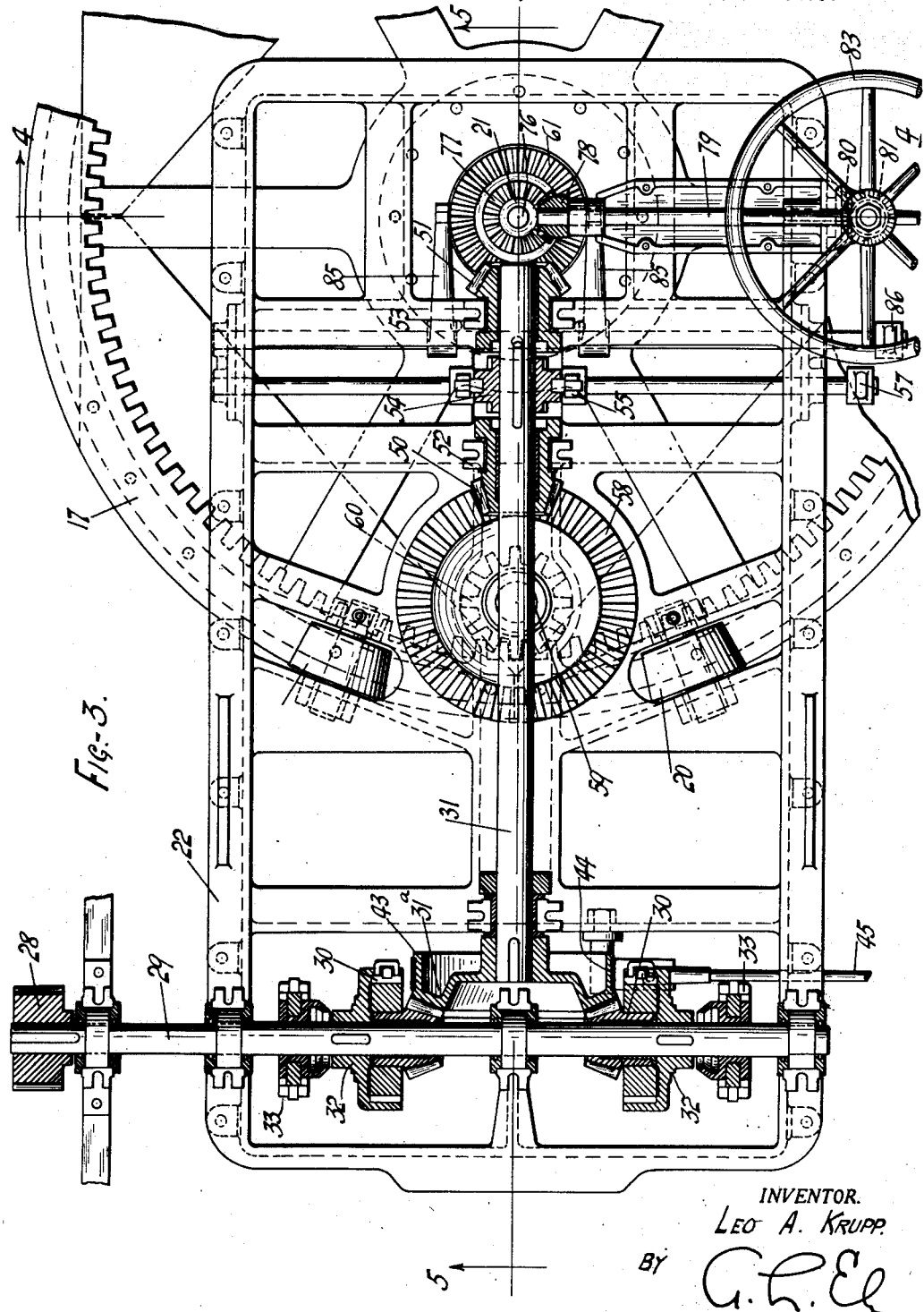
Figure 3 is an enlarged sectional plan of the main revolving deck frame.
Figure 4:
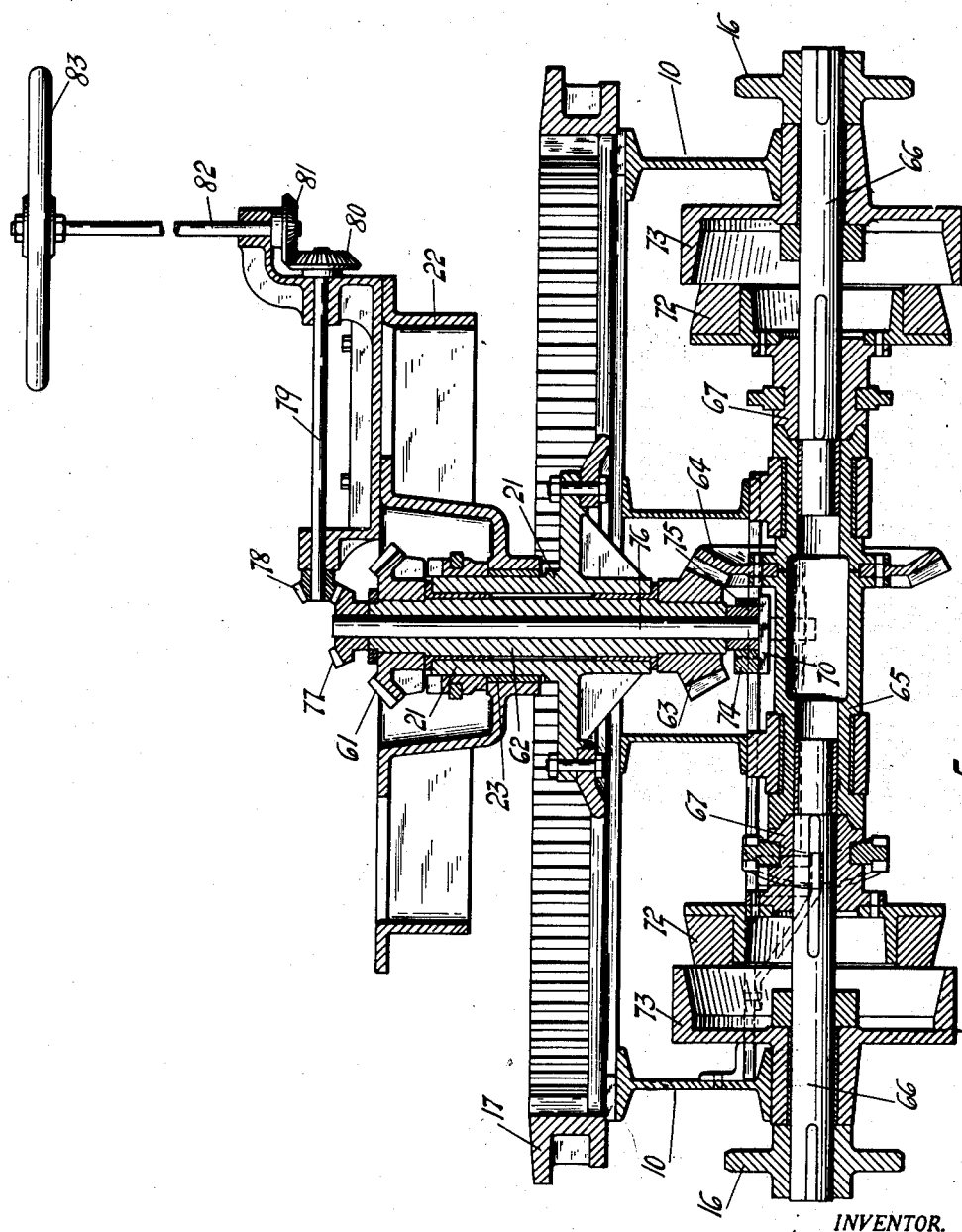
Figure 4 is a section on line 4—4 of Figure 3.
Figure 5:
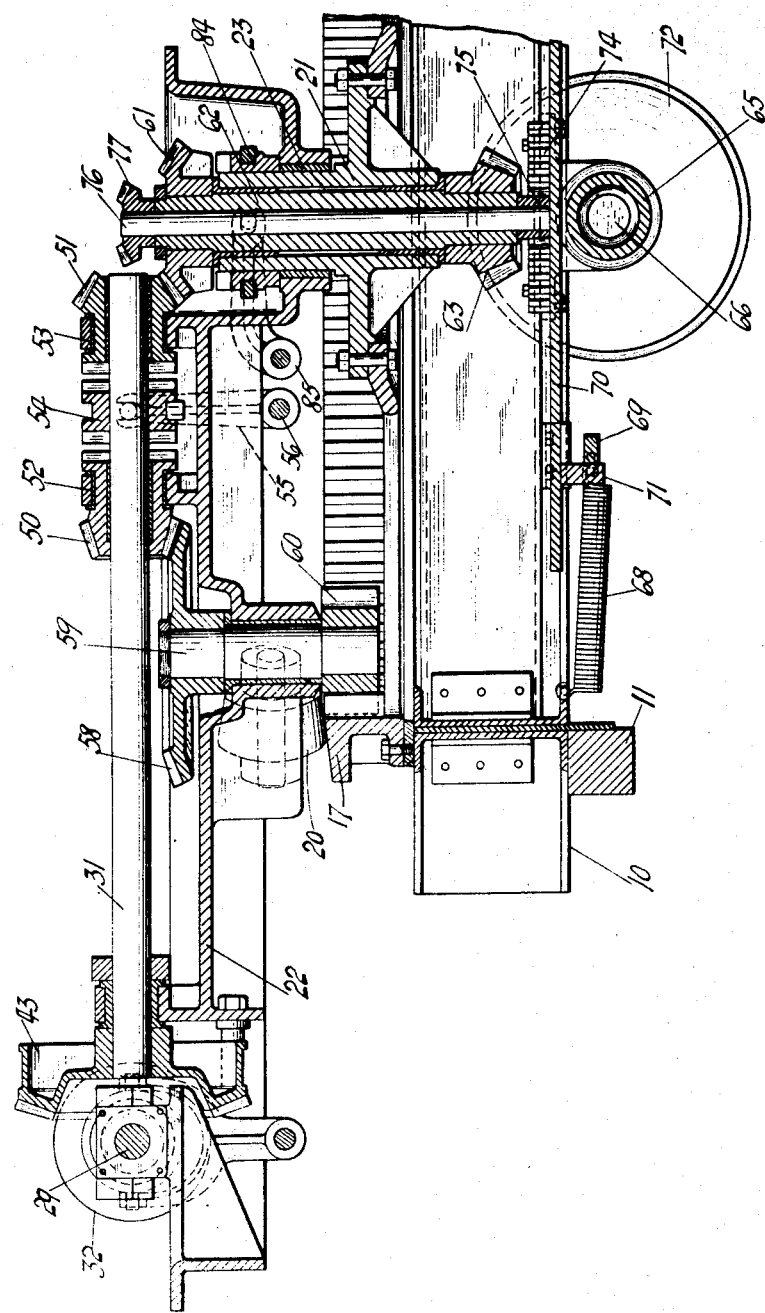
Figure 5 is a section on line 5—5 of Figure 3.

Referring to the drawings, 10 designates a carriage frame on which the shovel is mounted, the frame 10 being mounted on axles 11, 11 which are supported on frames 12 of any suitable form of apron wheels shown at 13, 13, which wheels may be driven by sprockets 14, 14, chains 15, 15 and sprockets 16, 16, the latter being driven and controlled by means to be described.

Supported on frame 10 is a circular rack 17 on which is revolubly mounted the deck indicated generally at 18 which supports the prime mover 19 and shovel operating instrumentalities to be briefly described. The deck 18 is supported on rack 17 by means of rollers 20, 20, journaled on the under side of said deck and by means of a center pin 21 mounted on frame 10 and about which the deck 18 revolves.

The deck 18 comprises a main supporting frame 22 journaled at 23 on pin 21 and carrying thereon the means for swinging the deck and also the means for propelling and controlling the apron wheels. The prime mover 19 drives a pinion 24 which is meshed with a gear 25 secured on a shaft 26 journaled on deck 18 and adapted to drive the shovel operating hoist drums indicated at 27, operation of which may be controlled in any suitable manner not described herein. Meshed with gear 25 is a pinion 28 secured on a jack shaft 29 journaled in deck frame 22.

Jack shaft 29 has journaled thereon reversed bevel pinions 30, 30 both meshing with a bevel gear 31ª secured on a longitudinal shaft 31 journaled in frame 22. In order that either of pinions 30 may be clutched to shaft 29 to drive shaft 31 in one direction or the other, or to permit neutral operation of shaft 29, clutches 32, 32 are provided on shaft 29, the clutches 32 being simultaneously operable by means of yokes 33, 33 secured on a reciprocable rod 34 operable in either direction by means of a T-shaped bell crank lever 35 pivoted onto deck 18 and the trunk of which is connected to rod 34 by a link 36. Bell crank lever 35 is operable in one direction by a rod 37 connected to a foot pedal 38 and in the other by means of a rod 39 connected to a foot pedal 40, all mounted on deck 18. A brake is provided for control of shaft 31, this brake including a drum 43 formed integral with gear 31ª and on which is a band 44 controlled by a rod 45 connected to one arm of a bell crank 46 pivoted onto deck 18, the other arm being connected by a rod 47 to a foot pedal 48 mounted on deck 18 adjacent pedals 38 and 40. Pedal 48 is controlled by a spring 49 for normally holding the brake 44 disengaged.

Shaft 31 is provided for operating both the shovel revolving mechanism and the apron wheels. To this end there are journaled thereon reversed bevel pinions 50 and 51, each also respectively journaled in bearings 52 and 53 fixed on frame 22. Either gear 50 or gear 51 may be clutched to shaft 31 by a double acting clutch 54 thereon operable by means of a yoke 55 on a shaft 56 journaled in frame 22 and having secured thereon a lever 57. Gear 50 is meshed with a bevel gear 58 secured on a vertical shaft 59 journaled on frame 22 and having thereon a pinion 60 meshed with circular rack 17.

Gear 51 is meshed with a bevel gear 61 secured on a sleeve shaft 62 journaled in center pin 21 and extending downwardly therethrough, a bevel gear 63 being secured on its lower end. Gear 63 meshes with and drives a bevel gear 64 secured on a sleeve 65 journaled in frame 10 and in which are journaled the inner ends of shafts 66, 66, the outer ends of which are journaled on frame 10. Apron wheel drive sprockets 16 are secured on these shafts.

Sleeve 65 is normally clutched by clutches 67, 67 to drive both shafts 66 equally. Clutches 67 are urged into engagement with sleeve 65 by means of tensile springs 68 each connected to frame 10 and each to one arm of a bell crank lever 69 pivoted on frame 10 and the other arm of which is adapted to operate one clutch 67. Steering of the shovel may be accomplished by operation of clutches 67 by means of the following mechanism:

Slidably mounted beneath gear 63 on frame 10 is a plate 70 arranged for movement parallel and close to the face of gear 64 and having pins 71, 71 thereon for engaging one arm of each of levers 69, said pins being so positioned that when said plate is moved in one direction away from the neutral position (Figure 6), one pin will operate one lever 69 to disengage one clutch 67 while the other pin will move away from the other lever 69, thus leaving the other clutch engaged and vice versa. Each clutch 67 which is keyed onto shaft 16, preferably carries a brake 72 whereby continued movement of a clutch member 67 by a pin 71 on plate 70 will engage a brake 72 with a fixed brake drum 73 secured on frame 10. Thus one apron wheel 13 may be merely disconnected from its driving means and permitted to creep while the other is positively driven to negotiate a wide turn, or said first apron wheel may be braked against said creeping action while the other is positively driven to negotiate sharper turns and vice versa.

Control of plate 70 from deck 18 may be accomplished by means of a rack 74 secured on plate 70 and meshed with a pinion 75 secured on a shaft 76 extending through center pin 21 and journaled in sleeve 62. Shaft 76 has a bevel gear 77 on its upper end meshed with a bevel gear 78 secured on a shaft 79 journaled on frame 22. On shaft 79 is another bevel gear 80 meshed with a bevel gear 81 on the lower end of a steering shaft 82 extending upwardly from deck 18 and operable by a steering wheel 83.

When the shovel is in position for excavating, it is preferable that the apron wheel drive through the center pin be locked against operation. There is accordingly provided a locking member 84 shiftable on pin 21 into engagement with gear 61 to lock it against rotation, member 84, in effect, securing gear 61 to the center pin 21. For shafting the member 84, a yoke 85 is pivoted on deck frame 22 and is operable by a hand lever 86 arranged adjacent lever 57.

The shovel or crane carried by deck 18 may be of any type, the particular shovel here shown comprising a scoop 87 carried by a boom 88 pivoted on a carriage 89 having pinions 90, 90 thereon meshing with J-shaped crowding racks 91, 91, carriage 89 having thereon a drum 92 on which is wound a cable 93 extending over a sheave 94 and onto one winding drum 27 on shaft 26 whereby unwinding of cable 93 from drum 94 will project boom 88 outwardly to perform an excavating operation. Raising and lowering of the boom may be effected by a cable 95 secured to a mast 96 extending about a sheave 97 on the end of boom 88, over a sheave 98 on mast 96 and onto the other winding drum 27 on shaft 26, suitable means (not shown) being provided on deck 18 to control the operation of drums 27 independently. Retraction of the boom 88 may be effected by elevation of its outer end while permitting gravity to urge its inner end inwardly.

Prime mover 19 being in operation, propelling of the shovel is accomplished by releasing lock 84 and shifting clutch 54 into engagement with gear 51. These operations are respectively accomplished by operation of levers 86 and 57. Pedal 38 or 40 will now be depressed, depending upon the desired direction of travel, whereby the apron wheels will be driven from the continuously revolving jack shaft 34 by means of shaft 31, sleeve shaft 62, shafts 66 and drive sprockets 16, which various shafts are geared together as has been described.

Steering of the shovel while traveling in either direction is accomplished by operation of steering wheel 83 which, by means of shafts 82, 79 and 76, moves plate 70 in one direction or the other either that degree sufficient to disengage only one clutch 67 or the other by engagement of one pin 71 or the other with one lever 69 or the other, whereby one apron wheel 13 or the other will be positively driven, the other being permitted to creep to make a wide turn, or that degree sufficient to engage one brake 72 or the other to retard or entirely stop one apron wheel, the other being positively driven to make sharper turns.

When the shovel is in position for excavating, pedals 38 and 40 will be operated to their neutral positions, lever 57 will be operated to disengage clutch 54 from gear 51 and lever 86 will be operated to lock the traction drive gear 61 to the center pin 21. The clutch 54 is engaged with gear 51. The various excavating operations may now be accomplished by proper operation of drums 27, revolving of the shovel in one direction or the other being accomplished by depressing one pedal 38 or the other, whereby shaft 31 will be driven in one direction or the other and will drive gear 50 which will drive gear 58, the latter in turn driving pinion 60.

It will appear from the foregoing that an improved device has been provided for propelling and steering an apron wheel carriage from a prime mover and by means of a steering device, both of which are supported on a revolving deck mounted on said carriage.

Modifications of the invention may be resorted to without departing from the spirit thereof or the scope of the appended claims.

What is claimed is:

1. Apparatus of the class described, comprising a carriage, apron wheels on each side thereof for supporting and driving the carriage, independent shafts on the carriage, one for driving each apron wheel, a center pin on the carriage, a deck revoluble on the carriage about said pin, a prime mover on the deck, a shaft adapted to be driven by the prime mover and extending down through said center pin and adapted to drive either or both of said independent shafts, a clutch for connecting each independent shaft to said driven shaft, a brake on each independent shaft connected to each clutch, a lever for operating each clutch, yielding means for normally holding each clutch engaged, a reciprocatory plate having means thereon for engaging one lever to disengage a clutch when moved in one direction and for engaging the other lever to disengage a clutch when moved in the other direction, one brake or the other being adapted to be engaged by continued movement of said plate in one direction or the other, and means for reciprocating said plate comprising a rack on the plate, a shaft extending from said deck down through said center pin and a pinion on the shaft meshed with the rack.

2. Apparatus of the class described, comprising a carriage, apron wheels for supporting and driving the carriage, a center pin on the carriage, a deck revoluble on the carriage about said center pin, a prime mover on the deck, means driven by the prime mover extending down through said center pin for driving the apron wheels, independently operable means on said carriage by which each apron wheel is driven, means normally connecting both of said independent means to the first means, said connecting means comprising clutches, means for yieldingly holding each of said clutches engaged, and means comprising a shaft manually operable on the deck and extending down through the center pin, a gear on the lower end of said shaft, and a rack reciprocable by said gear for selectively disengaging one clutch or the other against the action of its holding means, a brake on each independent means, each brake being adapted to be engaged by continued movement of the corresponding clutch away from its engaging position.

3. Apparatus of the class described, comprising a carriage, a wheel on each side of the carriage for supporting and driving the same, a center pin on the carriage, a deck revoluble on the carriage about said pin, a prime mover on the deck, a shaft adapted to be driven by the prime mover, said shaft extending down through the center pin, means adapted to connect each wheel to said shaft to be driven thereby, a brake on each wheel, and means comprising a shaft controllable from said deck and extending down through said center pin, a gear on the lower end of said shaft, and a rack reciprocable by said gear for disconnecting one of said connecting means or the other from said shaft, and also for engaging one brake or the other to retard or stop the wheel thus disconnected from said drive shaft.

4. Apparatus of the class described, comprising a carriage, a wheel on each side of the carriage for supporting and driving the same, a center pin on the carriage, a deck revoluble on the carriage about said pin, a prime mover on the deck, a shaft adapted to be driven by the prime mover, said shaft extending down through the center pin, means adapted to connect each wheel to said shaft to be driven thereby, a brake on each wheel, and means comprising a shaft controllable from said deck and extending down through said center pin, and a reciprocable member geared to said shaft for disconnecting one of said connecting means or the other from said shaft and applying the corresponding brake.

5. In apparatus of the class described, a carriage, a deck revoluble on the carriage, a wheel on each side thereof, a power driven shaft extending from the deck through the axis thereof on the casing, independent shafts connected to each wheel, a clutch for connecting each independent shaft to the power driven shaft, yielding means for holding each clutch engaged, a reciprocatory rack member, means on the member so disposed as normally to permit both clutches to be engaged, but when the member is moved in one direction, one clutch will be disengaged, and when moved in the other direction, the other clutch will be disengaged, and means for moving said member comprising a shaft operable from the deck and concentric with the axis of the deck.

6. Apparatus of the class described, comprising a carriage, including a frame, wheels, one on each side thereof for driving and steering the carriage, a deck revoluble on the carriage, a prime mover on the deck, a power shaft in the axis of the deck and adapted to be driven by the prime mover, a two part wheel driving shaft on the frame, meshed gears respectively on the power shaft and the wheel driving shaft, clutches on the wheel driving shaft respectively for each wheel and adapted to be connected to the gear on the wheel driving shaft, brakes on the wheel driving shaft respectively for each wheel, and means for controlling the clutches and brakes comprising a shaft extending through the axis of the deck having a pinion on its lower end, a rack plate on the carriage movable substantially parallel and close to the wheel shaft gear, said pinion being meshed with said rack, and means connecting the rack to the clutches and brakes.

7. Apparatus of the class described, comprising a carriage, including a frame, wheels, one on each side thereof for driving and steering the carriage, a deck revoluble on the carriage, a prime mover on the deck, a power shaft in the axis of the deck and adapted to be driven by the prime mover, a two part wheel driving shaft on the frame, meshed gears respectively on the power shaft and the wheel driving shaft, clutches on the wheel driving shaft respectively for each wheel and adapted to be connected to the gear on the wheel driving shaft, and means for controlling the clutches comprising a shaft extending through the axis of the deck having a pinion on its lower end, a rack plate on the carriage movable substantially parallel and close to the wheel shaft gear and meshed with said pinion, and means connecting the rack to the clutches

LEO A. KRUPP.